ic12) United States Patent
Zhang et al.

(10) Patent No.: US 12,160,064 B2
(45) Date of Patent: Dec. 3, 2024

(54) ELECTRICAL CONNECTION PLUG, ELECTRICAL CONNECTION DEVICE AND ELECTRIC VEHICLE

(71) Applicant: AULTON NEW ENERGY AUTOMOTIVE TECHNOLOGY GROUP, Shanghai (CN)

(72) Inventors: Jianping Zhang, Shanghai (CN); Chunhua Huang, Shanghai (CN)

(73) Assignee: AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 323 days.

(21) Appl. No.: 17/622,429

(22) PCT Filed: Jun. 28, 2020

(86) PCT No.: PCT/CN2020/098542
§ 371 (c)(1),
(2) Date: Dec. 23, 2021

(87) PCT Pub. No.: WO2020/259685
PCT Pub. Date: Dec. 30, 2020

(65) Prior Publication Data
US 2022/0328999 A1    Oct. 13, 2022

(30) Foreign Application Priority Data

Jun. 26, 2019   (CN) .......................... 201910562174.X

(51) Int. Cl.
*H01R 13/514*   (2006.01)
*B60L 58/26*    (2019.01)
(Continued)

(52) U.S. Cl.
CPC ............ *H01R 13/514* (2013.01); *B60L 58/26* (2019.02); *H01R 13/005* (2013.01); *H01R 13/5202* (2013.01); *H01R 2201/26* (2013.01)

(58) Field of Classification Search
CPC ............... H01R 13/514; H01R 13/005; H01R 13/5202; H01R 2201/26; H01R 13/6315;
(Continued)

(56) References Cited

U.S. PATENT DOCUMENTS 5,538,809 A * 7/1996 Bittihn .................... B60L 53/16
                                                    320/109
6,592,387 B2 * 7/2003 Komenda .......... H01R 13/6315
                                                    439/247
(Continued)

FOREIGN PATENT DOCUMENTS

CN    109119828 A    1/2019
CN    109286101 A    1/2019
(Continued)

OTHER PUBLICATIONS

English translation of the Written Opinion of the International Searching Authority dated Oct. 13, 2020 for corresponding International Application No. PCT/CN2020/098542, filed Jun. 28, 2020.
(Continued)

*Primary Examiner* — Alexander Gilman
(74) *Attorney, Agent, or Firm* — David D. Brush; Westman, Champlin & Koehler, P.A.

(57) ABSTRACT

An electrical connection plug, an electrical connection device and an electric. The electrical connection plug includes a first fixing plate, a mounting base, an electrical connection assembly and a plurality of plug-in assemblies, the electrical connection assembly and the plurality of the plug-in assemblies are all connected to the mounting base, and the mounting base is in floating connection with the first
(Continued)

fixing plate. The electrical connection device includes an electrical connection socket and the above electrical connection plug, the electrical connection assembly and the plurality of plug-in assemblies are all connected to the electrical connection socket. The electric vehicle includes a battery pack, a vehicle body and the above electrical connection device, the electrical connection plug is connected to the vehicle body, and the electrical connection socket is connected to the battery pack.

19 Claims, 4 Drawing Sheets

(51) Int. Cl.
*H01R 13/00* (2006.01)
*H01R 13/52* (2006.01)

(58) Field of Classification Search
CPC ..... H01R 13/502; H01R 24/005; B60L 58/26; B60L 15/007; B60L 50/64; H01M 2220/20; H01M 10/613; H01M 10/625; H01M 10/6567; H01M 50/249; F16L 39/00; F16L 3/06; F16L 3/2235; F16L 39/04
USPC ........................................................ 439/589
See application file for complete search history.

(56) References Cited

U.S. PATENT DOCUMENTS

| | | | | |
|---|---|---|---|---|
| 9,033,078 | B2* | 5/2015 | Fillion | H01M 50/249 |
| | | | | 180/68.5 |
| 2016/0052421 | A1* | 2/2016 | Galamb | B60L 53/302 |
| | | | | 165/47 |
| 2018/0345804 | A1* | 12/2018 | Nagel | H01R 13/6616 |
| 2019/0009680 | A1* | 1/2019 | Kauffmann | B60L 53/126 |
| 2019/0036254 | A1* | 1/2019 | Moseke | H01R 13/533 |
| 2019/0044203 | A1* | 2/2019 | Haag | H01M 50/229 |

FOREIGN PATENT DOCUMENTS

| | | |
|---|---|---|
| CN | 208919527 U | 5/2019 |
| CN | 208993479 U | 6/2019 |
| CN | 210296714 U | 4/2020 |
| CN | 210344629 U | 4/2020 |

OTHER PUBLICATIONS

International Search Report dated Aug. 26, 2020 for corresponding International Application No. PCT/CN2020/098542, Jun. 28, 2020.
Written Opinion of the International Searching Authority dated Aug. 26, 2020 for corresponding International Application No. PCT/CN2020/098542, filed Jun. 28, 2020.
Extended European Search Report dated May 30, 2023 for corresponding European Application No. 20832138.0.
First Chinese Office Action dated May 1, 2024, for corresponding Chinese Application No. 201910562174.X, filed Jun. 26, 2019.

* cited by examiner

ELECTRICAL CONNECTION PLUG, ELECTRICAL CONNECTION DEVICE AND ELECTRIC VEHICLE

CROSS-REFERENCE TO RELATED APPLICATION

This Application is a Section 371 National Stage Application of International Application No. PCT/CN2020/098542, filed Jun. 28, 2020, which published as WO 2020/259685 A1 on Dec. 30, 2020, not in English, which claims priority to Chinese patent application 201910562174X filed on Jun. 26, 2019, the entire contents of which are incorporated herein by reference.

FIELD

The present disclosure relates to an electrical connection plug, an electrical connection device and an electric vehicle.

BACKGROUND

An electric vehicle generally adopts a replaceable battery pack, which may be removed at any time for replacement or charging, and then mounted on a vehicle body after replacement or charging. Generally, an existing electric vehicle with replaceable structure is provided with a corresponding mounting position on a bracket of the vehicle body, and after the battery pack is placed in the mounting position, the battery pack is connected to a vehicle-end electrical connector on the vehicle body via a battery-end electrical connector, and then fixed through a locking device. during this process, an electrode of the battery-end electrical connector on the battery pack needs to be in contact with an electrode on the vehicle-end electrical connector to ensure a power output. A cooling system is further provided on the bracket of the vehicle body to cool the battery pack, and temperature of a cell inside the battery pack is transferred to an outside of the battery pack through liquid flow, so as to balance the temperature of the battery pack, improve full capacity of the battery pack, and directly improve performance indicators such as a limited use environment, a vehicle power performance and a battery life of the vehicle.

However, the electrical connectors and cooling pipelines of the electric vehicle are arranged separately from each other, such that usage space is relatively large. Moreover, the cooling pipeline adopts rigid connection mode. Due to various effects such as frequent replacement and vehicle body vibration, connections of the cooling pipelines are unstable, which even causes outflow and splashing of a liquid.

SUMMARY

A technical problem to be solved by the present disclosure is to provide an electrical connection plug, an electrical connection device and an electric vehicle, to overcome defects in the prior art such as separate arrangement of an electrical connection and a water connection, a large actual usage space, an unstable cooling pipeline connection.

The present disclosure solves the above technical problems through the following technical solutions:

An electrical connection plug, configured for an electrical connection between a battery pack and a vehicle body of an electric vehicle, including a first fixing plate, a mounting base, an electrical connection assembly and a plurality of plug-in assemblies, the plug-in assembly being configured to be passed by a cold source to cool the battery pack, the electrical connection assembly and the plurality of the plug-in assemblies being all connected to the mounting base, and the mounting base being in floating connection with the first fixing plate.

In this solution, with the above-mentioned structural form, the electrical connection plug realizes the water connection and the electrical connection at the same time through the electrical connection assembly and the plurality of plug-in assemblies, thereby reducing the actual usage space, solving the problem of the actual mounting space, and reducing the cost.

In addition, since the electrical connection assembly and the plurality of plug-in assemblies are all in floating connection with the first fixing plate through the mounting base, the electrical connection assembly and the plurality of plug-in assemblies are movable with the mounting base after the connection. Due to the floating connection, the stability of the water connection and the electrical connection of the electrical connection plug is greatly enhanced, and abnormalities such as electrical connection failure or burnout, as well as liquid outflow and splashing, are effectively avoided.

An electrical connection device is provided and includes an electrical connection plug, wherein the electrical connection plug includes: a first fixing plate, a mounting base, an electrical connection assembly and a plurality of plug-in assemblies, the plug-in assembly is configured to be passed by a cold source to cool the battery pack, the electrical connection assembly and the plurality of the plug-in assemblies are all connected to the mounting base, and the mounting base are in floating connection with the first fixing plate.

An electric vehicle is provided and includes a battery pack, a vehicle body and an electrical connection device, wherein the electrical connection device includes an electrical connection plug, wherein the electrical connection plug includes: a first fixing plate, a mounting base, an electrical connection assembly and a plurality of plug-in assemblies, the plug-in assembly is configured to be passed by a cold source to cool the battery pack, the electrical connection assembly and the plurality of the plug-in assemblies are all connected to the mounting base, and the mounting base are in floating connection with the first fixing plate;

wherein the electrical connection plug is connected to the vehicle body, and the electrical connection socket is connected to the battery pack.

DETAILED DESCRIPTION

The following further illustrates the present disclosure by way of embodiments, but the present disclosure is not limited to the scope of the embodiments.

Figure 1:
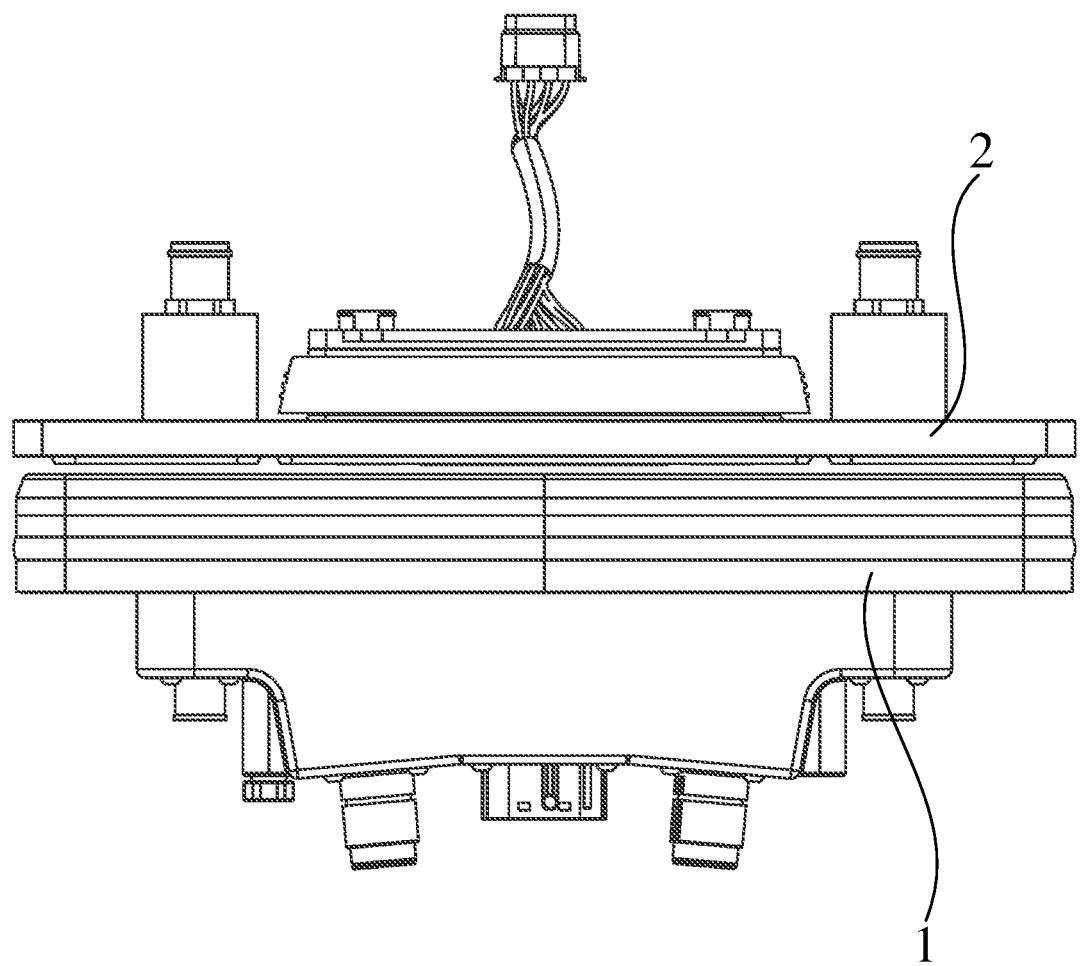
FIG. 1 is a schematic view of an electrical connection device of an electric vehicle according to an embodiment of the present disclosure.
Figure 2:
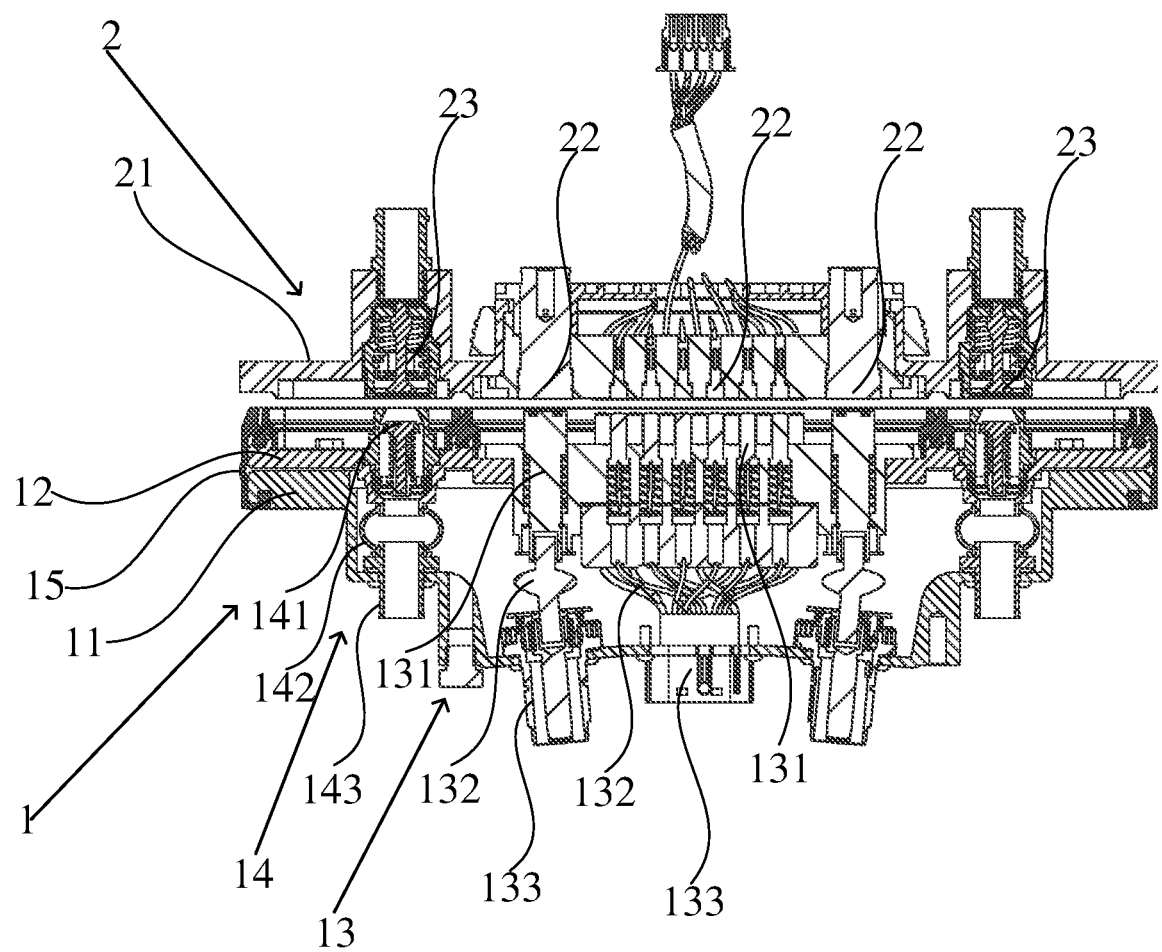
FIG. 2 is a schematic view of an internal structure of an electrical connection device of an electric vehicle according to an embodiment of the present disclosure.
Figure 3:
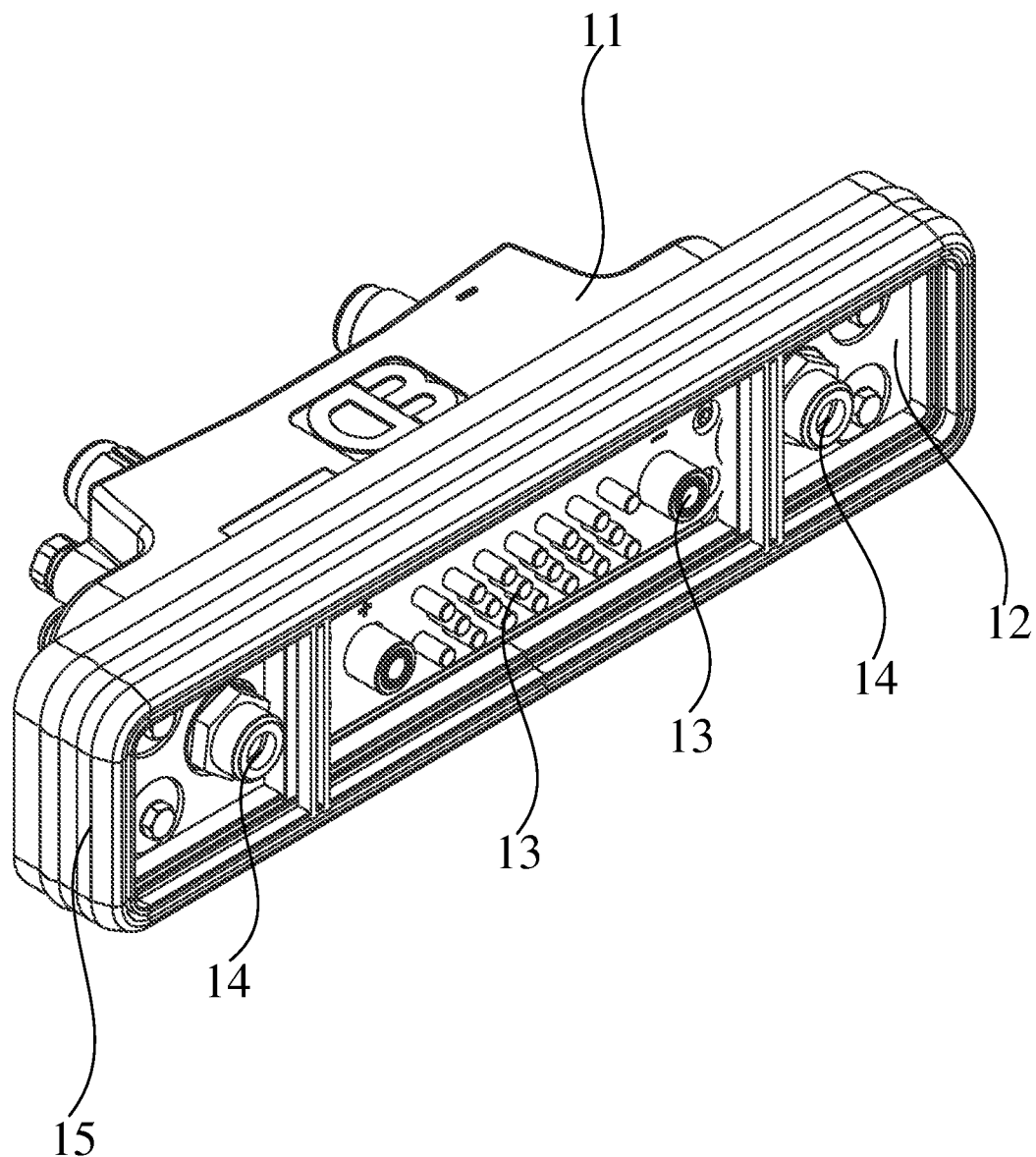
FIG. 3 is a schematic view of an electrical connection plug of an electrical connection device of an electric vehicle according to an embodiment of the present disclosure.
Figure 4:
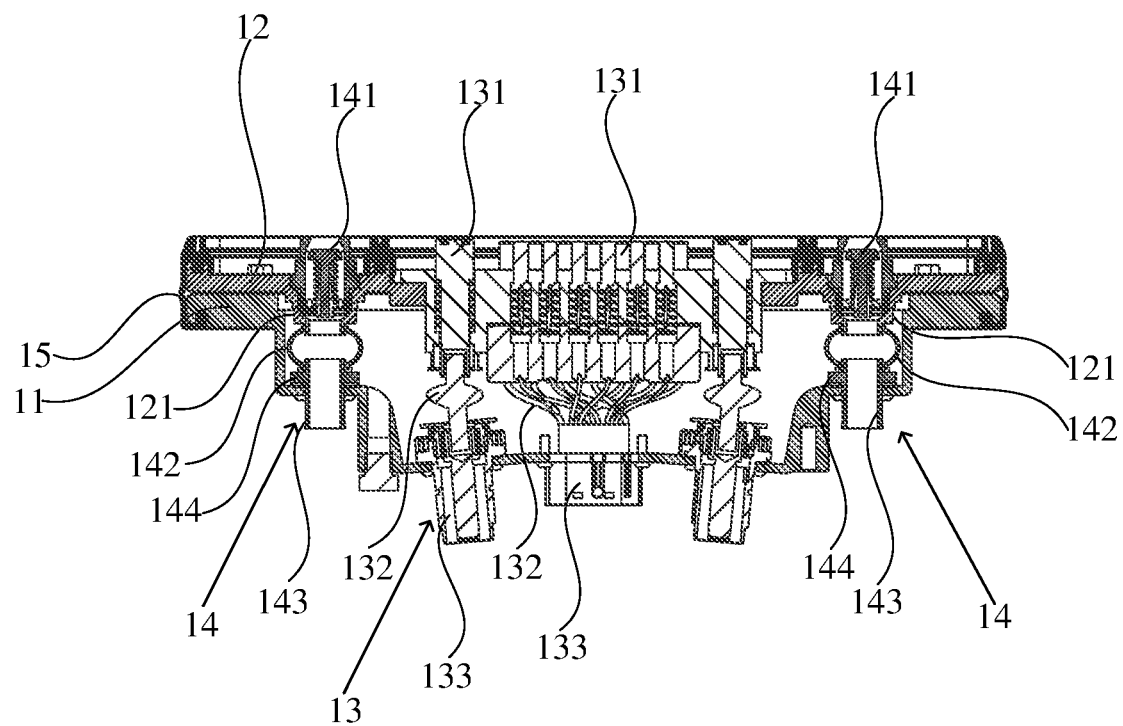
FIG. 4 is a schematic view of an internal structure of an electrical connection plug of an electrical connection device of an electric vehicle according to an embodiment of the present disclosure.
Figure 5:
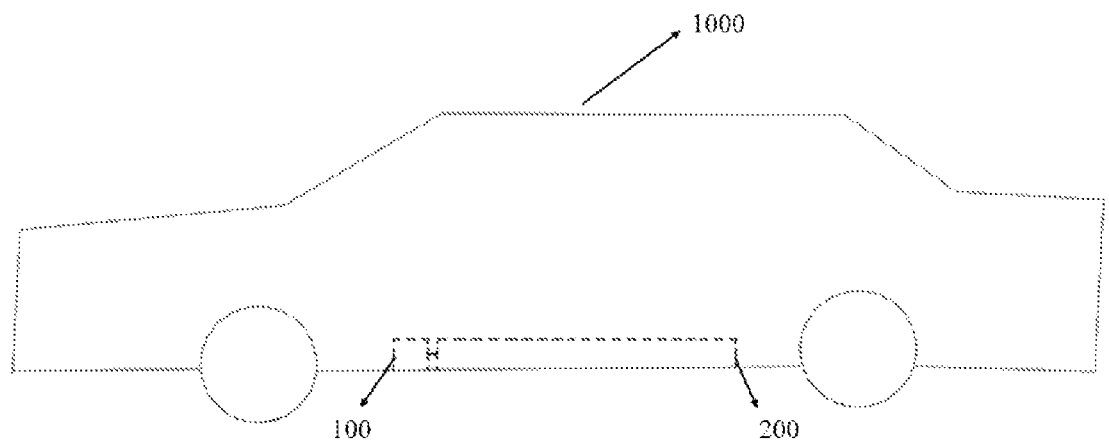
FIG. 5 is a schematic view of an electric vehicle with an electrical connection device according to an embodiment of the present disclosure.

As shown in FIG. 1, FIG. 2, FIG. 3, FIG. 4 and FIG. 5, the embodiments of the present disclosure disclose an electric vehicle 1000 including a battery pack 200, a vehicle body and an electrical connection device 100. The electrical connection device 100 includes an electrical connection plug 1 and an electrical connection socket 2, the electrical connection plug 1 is connected to the vehicle body, and the electrical connection socket 2 is connected to the battery pack 200. The electrical connection plug 1 and the electrical connection socket 2 are configured to be mounted on the vehicle body and the battery pack 200 of the electric vehicle 1000, respectively. Through the connection between the electrical connection plug 1 and the electrical connection socket 2, an electrical connection between the battery pack 200 and the vehicle body of the electric vehicle 1000 is realized.

The electrical connection plug 1 includes a first fixing plate 11, a mounting base 12, an electrical connection assembly 13 and a plurality of plug-in assemblies 14, the electrical connection assembly 13 and the plurality of plug-in assemblies 14 are all connected to the mounting base 12, and the mounting base 12 and the first fixing plate 11 are in floating connection. A gap is defined between the first fixing plate 11 and the mounting base 12, the first fixing plate 11 is fixedly mounted on the vehicle body, and the first fixing plate 11 and the mounting base 12 are connected with each other through the electrical connection assembly 13 and the plurality of plug-in assemblies 14. The electrical connection assembly 13 and the plurality of plug-in assemblies 14 are all deformed through a structure between the first fixing plate 11 and the mounting base 12, such that the mounting base 12 may be displaced relative to the first fixing plate 11, thereby effectively enhancing the stability of the water connection and the electrical connection of the electrical connection device 100.

The electrical connection plug 1 is connected to the electrical connection socket 2 through the electrical connection assembly 13 to realize the electrical connection, and the electrical connection plug 1 is connected to the electrical connection socket 2 through the plurality of plug-in assemblies 14 to realize the water connection, such that the electrical connection device 100 realizes the water connection and the electrical connection at the same time. Compared with the electrical connection and the water connection in the prior art, and that is, compared with the prior art in which a cold source plug-in component and an electrical connection assembly are arranged on different mounting plates, the electrical connection device 100 in the present embodiment centralizes the electrical connection assembly 13 and the plurality of plug-in assemblies 14 on the mounting base 12, the electrical connection and the water connection control each other, have a high connection accuracy, and reduce excessive positioning structures, so as to reduce the actual usage space, solve the problem of the actual mounting space, and reduce cost. Since the electrical connection assembly 13 and the plurality of plug-in assemblies 14 are all in floating connection with the first fixing plate 11 through the mounting base 12, the electrical connection assembly 13 and the plurality of plug-in assemblies 14 are movable with the mounting base 12 after the connections. Due to the floating connection, the stability of the water connection and the electrical connection of the electrical connection device 100 is greatly enhanced, and abnormalities such as electrical connection failure or burnout, as well as liquid outflow and splashing, are effectively avoided.

The electrical connection socket 2 includes a second fixing plate 21, an electrical connector 22 and a plurality of plug-in sockets 23, the electrical connector 22 and the plurality of plug-in sockets 23 are all connected to the second fixing plate 21, and the electrical connector 22 is detachably in electrical connection with the electrical connection assembly 13. The plurality of plug-in sockets 23 are in one-to-one correspondence with the plurality of plug-in assemblies 14, and the plug-in socket 23 is detachably connected to the plug-in assembly 14. The electrical connector 22 and the plurality of plug-in sockets 23 are directly mounted and connected to the second fixing plate 21 to facilitate the mounting and the connection, the electrical connector 22 is connected to the electrical connection assembly 13 to realize the electrical connection, and the plug-in socket 23 is connected to the plug-in assembly 14 to realize the water connection. Through the connections between the plurality of plug-in sockets 23 and the plurality of plug-in assemblies 14, the plurality of plug-in assemblies 14 are connected to a cooling system of the vehicle body, and the plurality of plug-in sockets 23 are connected to a battery end, such that the cooling water provided by the external cooling system realizes a circulating cooling of the battery pack 200 through the plurality of plug-in assemblies 14 and the plurality of plug-in sockets 23.

The plug-in assembly 14 includes a connection pipe 143, an elastic connection pipe 142 and a plug-in connector 141. The plug-in connector 141 is connected to the mounting base 12, the connection pipe 143 is connected to the first fixing plate 11, the elastic connection pipe 142 is located between the mounting base 12 and the first fixing plate 11, and two ends of the elastic connection pipe 142 are in communication with the connection pipe 143 and the plug-in connector 141, respectively. The connection pipe 143 is connected to the first fixing plate 11, the plug-in connector 141 is connected to the mounting base 12, the connection pipe 143 and the first fixing plate 11 are in a fixed state, and the plug-in connector 141 is fixedly connected to the mounting base 12. The elastic connection pipe 142 may deform telescopically along an axial direction or deform torsionally along a radial direction, such that the first fixing plate 11 and the mounting base 12 may float, and deform through the elastic connection pipe 142, thereby realizing the axial telescopic and radial torsional connection between the connection pipe 143 and the plug-in connector 141. The connection pipe 143 and the plug-in connector 141 may be in the floating connection, and the plug-in assembly 14 is movable therewith during the water connection, thus realizing that the electrical connection plug 1 is more reliable during the water connection, and external leakage is effectively avoided.

The elastic connection pipe 142 is made of flexible material. The connection pipe 143 and the plug-in connector 141 are in the floating connection through the elastic connection pipe 142. In some embodiments, material of the elastic connection pipe 142 is rubber, which reduces the cost.

One side of the mounting base 12 facing the first fixing plate 11 is provided with a plurality of protruding portions 121, the plurality of protruding portions 121 are in one-to-one correspondence with the plurality of plug-in assemblies 14, and the elastic connection pipe 142 and the plug-in connector 141 are connected to two ends of the protruding portion 121 respectively and in communication with each other through the protruding portion 121. The protruding portions 121 protrude and extend outward in a direction close to the first fixing plate 11, and the elastic connection pipe 142 and the plug-in connector 141 are connected to the two ends of the protruding portion 121, respectively, thereby increasing connection area between the plug-in assembly 14 and the mounting base 12, realizing a convenient connection and high connection strength.

The plug-in connector 141 is sealingly connected to an inner wall surface of the protruding portion 121, and the elastic connection pipe 142 is sealingly fitted over an outer circumferential surface of the protruding portion 121. The elastic connection pipe 142 and the plug-in connector 141 are sealingly connected to the outer circumferential surface and the inner wall surface of the protruding portion 121, respectively, such that the connection area between the elastic connection pipe 142 and the plug-in connector 141 with the protruding portion 121 is large, thereby realizing a convenient connection and high connection strength. The plug-in connector 141 is threadedly connected in the protruding portion 121, the elastic connection pipe 142 is connected to the outer circumferential surface of the protruding portion 121 through tight-hoop connection, and the elastic connection pipe 142 is connected to an outer circumferential surface of the connection pipe 143 through tight-hoop connection, so as to further facilitate the connection with well sealing performance. The plug-in connector 141 may be embedded into the protruding portion 121 through a conical screw tooth and a thread seal tape, and sealingly connected with the mounting base 12, which is very convenient for the connection with the high connection strength, the sealing state is well, and the waterproof-sealing level of the electrical connection device 100 may reach above IP67.

In the present embodiment, the two ends of the elastic connection pipe 142 are sealingly fitted over the connection pipe 143 and the protruding portion 121 through tight hoops, respectively. Of course, the plug-in assembly 14 may also be connected by using a quick plug structure, that is, the two ends of the elastic connection pipe 142 are connected to the connection pipe 143 and the protruding portion 121 by using the quick plug structures, respectively. A self-locking structure may also be provided to be mounted on the connection pipe 143 and the protruding portion 121, and both the connection pipe 143 and the protruding portion 121 are mounted and connected to the elastic connection pipe 142 through the self-locking structure, which still ensures that the waterproof-sealing level of the electrical connection device 100 is able to reach above IP67.

The connection pipe 143 passes through the first fixing plate 11, a connection portion 144 is provided on the outer circumferential surface of the connection pipe 143, the connection portion 144 is connected to the first fixing plate 11, and the elastic connection pipe 142 is sealingly connected to the connection pipe 143. The connection portion 144 protrudes and extends outward and protrudes from the outer circumferential surface of the connection pipe 143 in a radial direction of the plug-in assembly 14, and the connection pipe 143 is fixedly connected to the first fixing plate 11 through the connection portion 144, so as to facilitate the connection.

The two ends of the elastic connection pipe 142 are sealingly connected to the connection pipe 143 and the mounting base 12, respectively, and are in communication with the connection pipe 143 and the plug-in connector 141. The connection pipe 143, the elastic connection pipe 142 and the plug-in connector 141 are all configured to be passed by a cold source. The connection pipe 143 is configured to connect the cooling system, when the plug-in assembly 14 is in a sealing state. The cold source provided by the cooling system successively passes through the connection pipe 143, the elastic connection pipe 142 and the plug-in connector 141, and then flows into the battery pack 200 through the plug-in socket 23 of the electrical connection socket 2, to cool the battery pack 200.

The electrical connection plug further includes an annular sealing ring 15 fitted over the mounting base 12 and the first fixing plate 11, and two sides of an inner wall surface of the annular sealing ring 15 are connected to the mounting base 12 and the first fixing plate 11, respectively. The annular sealing ring 15 has a sealing effect. The annular sealing ring 15 is respectively connected to the mounting base 12 and the first fixing plate 11 in a surrounding manner, and the mounting base 12 and the first fixing plate 11 is defined with a gap, such that the mounting base 12 and the first fixing plate 11 may be in the floating connection, thereby ensuring the elastic reset of the mounting base 12 and effectively strengthening the sealing effect of the electrical connection plug 1. When the electrical connection device 100 is in use, the annular sealing ring 15 sealingly abuts against the second fixing plate 21, the sealing is realized between the annular sealing ring 15 and the electrical connection socket 2, such that the waterproof-sealing performance of the electrical connection device 100 is well. Disc springs may be arranged at four corners between the mounting base 12 and the first fixing plate 11, and the elastic reset of the mounting base 12 is further ensured through the disc springs.

A plurality of separation portions are provided in the annular sealing ring 15, two ends of each of the plurality of separation portions are connected to the annular sealing ring 15 and separate a space in the annular sealing ring 15 into a plurality of closed spaces. The separation portion is configured to sealingly abut against the second fixing plate 21, such that the plurality of closed spaces are not in communication with each other. Through the separation portion, the electrical connection assembly 13 and the plug-in assembly 14 that are mounted on the mounting base 12 may be separated from each other, such that the electrical connection and the water connection of the electrical connection device 100 are separated from each other, thereby further ensuring the safety and stability of the electrical connection.

The electrical connection assembly 13 includes a conductive pole 131, a flexible conductive member 132 and a conductive plug 133. The conductive pole 131 passes through the mounting base 12, the conductive plug 133 passes through the first fixing plate 11, and two ends of the flexible conductive member 132 are connected to the conductive pole 131 and the conductive plug 133, respectively. The electrical connection assembly 13 is connected to the electrical connector 22 of the electrical connection socket 2 through the conductive pole 131 to realize the electrical connection. The flexible conductive member 132 may deform itself, such that the floating electrical connection between the conductive plug 133 and the conductive pole 131 may be realized through the flexible conductive member 132. During the electrical connection device 100 is in electrical connection, the conductive pole 131 is movable with the electrical connector 22, so as to effectively avoid the failure of the electrical connection, and greatly enhance the reliability and the service life of electrical connection device 100 during the electrical connection.

The flexible conductive member 132 may include an elastic conductive wire, and two ends of the elastic conductive wire are connected to the conductive pole 131 and the conductive plug 133, respectively. The elastic conductive wire is elastic and may be in electrical connection with the conductive pole 131 and the conductive plug 133.

The flexible conductive member 132 may further include a conductive spring, and two ends of the conductive spring are connected to the conductive pole 131 and the conductive plug 133, respectively. The conductive spring may deform itself and may also be in electrical connection to the conductive pole 131 and the conductive plug 133.

The flexible conductive member 132 may be defined with a cavity made of flexible conductive material, and two ends of the cavity are connected to the conductive pole 131 and the conductive plug 133, respectively. The cavity may be elongated or compressed and twisted radially, and is adaptable to relative displacement changes in axial direction and radial direction or at any angles between the conductive pole 131 and the conductive plug 133, thereby avoiding deterioration of the electrical connection performance of the electrical connection assembly 13 due to the relative displacement changes, and greatly improving the stability of the electrical connection device 100 during the electrical connection. The cavity may be a spherical-like elastic cavity surrounded by a plurality of flexible conductive tapes or by a grid-like flexible conductive members, and the cavity may also be a spherical-like elastic cavity interwoven from metal wires or formed by stretching a metal conductive tape.

In the present embodiment, number of the electrical connection assemblies 13 and the electrical connectors 22 are not limited. The electrical connection assembly 13 and the electrical connector 22 may be a low-voltage socket and a low-voltage plug, a high-voltage socket and a high-voltage plug respectively. The high-voltage socket is fitted with the high-voltage plug, and the low-voltage socket is fitted with the low-voltage plug. During the electrical connection, the electrical connection device 100 may use the principle of controlling a high voltage through a low voltage, that is, during the electrical connection plug 1 and the electrical connection socket 2 are in electrical connection, the connection between the high voltage socket and the high voltage plug precedes the connection between the low voltage socket and the low voltage plug, and the high-voltage socket and the high-voltage plug may contact and be energized only after the low-voltage socket and the low-voltage plug are in good contact. During the disassembly of the electrical connection plug 1 and the electrical connection socket 2, a disconnection between the low-voltage socket and the low-voltage plug precedes a disconnection between the high-voltage socket and the high-voltage plug, and when the low voltage is disconnected first, the high voltage is controlled to be power-off, so as to effectively avoid adverse phenomena such as an electrical arc between the high-voltage socket and the high-voltage plug during the disassembly, and greatly improve the safety and the reliability of the electrical connection device 100 during the electrical connection.

One end of the plug-in assembly 14 facing the plug-in socket 23 is provided with the plug-in connector 141, the plug-in socket 23 is fitted over the plug-in connector 141 and is movable along a length direction of the plug-in connector 141, and the plug-in socket 23 is in communication with the plug-in connector 141. The plug-in socket 23 is fitted over the plug-in connector 141 and is movable along the length direction of the plug-in connector 141. The plug-in socket 23 and the plug-in connector 141 may play a positioning role, and the electrical connection plug 1 is inserted into the plug-in socket 23 of the electrical connection socket 2 through the plug-in connector 141 so as to realize the accurate water connection of the electrical connection device 100, and ensure the accuracy of the water connection and the electrical connection. Structures such as a positioning pin and a positioning sleeve between the electrical connection plug 1 and the electrical connection socket 2 may be omitted, so as to reduce the cost.

The plug-in connector 141 and the electrical connection assembly 13 are both exposed out of a side surface of the mounting base 12 facing the second fixing plate 21, and a connection between the plug-in connector 141 and the plug-in socket 23 precedes a connection between the electrical connection assembly 13 and the electrical connector 22. During the electrical connection plug 1 and the electrical connection socket 2 are connected, the plug-in connector 141 is first inserted into the plug-in socket 23, such that the subsequent electrical connection assembly 13 and the electrical connector 22 are accurately connected under the positioning effect of the plug-in socket 23 and the plug-in connector 141, so as to effectively avoid the use of excessive positioning structures, solve the problem of interference between the positioning structures, ensure the accuracy of the water connection and the electrical connection, increase the service life and reduce the cost. After the plug-in socket 23 and the plug-in connector 141 are in communication with each other, the electrical connection assembly 13 and the electrical connector 22 are connected, such that the electrical connection may be performed only after the water connection is finished, and the cooling water may be cyclically used only after the electrical connection is finished, thereby effectively avoiding the leakage of cooling water. Of course, when the electrical connection plug 1 and the electrical connection socket 2 are disconnected, the plug-in socket 23 and the plug-in connector 141 may be disconnected only after the electrical connection assembly 13 and the electrical connector 22 are disconnected, such that the cooling water is no longer provided before the plug-in socket 23 and the plug-in connector 141 are disconnected, so as to further avoid the leakage of the cooling water. In the combined application of the water connection and the electrical connection, the electrical connection assembly 13 may detect the electrical connection between the electrical connection assembly 13 and the electrical connector 22, and that is, signal detection is performed to a low-voltage signal terminal to control the on-off control of the water cooling pump of the actual vehicle, which is conducive to the actual control of adverse problems such as bubbles after instantaneous leakage of liquid cooling.

Although the specific embodiments of the present disclosure are described above, those skilled in the art should understand that these are only examples, and various changes or modifications can be made to these embodiments without departing from the principle and essence of the present disclosure. Therefore, the protection scope of the present disclosure is defined by the appended claims.

What is claimed is:

1. An electrical connection plug, configured for an electrical connection between a battery pack and a vehicle body of an electric vehicle, comprising:
   a first fixing plate, a mounting base, an electrical connection assembly and a plurality of plug-in assemblies, the plug-in assembly being configured to be passed by a cold source to cool the battery pack, the electrical connection assembly and the plurality of the plug-in assemblies being all connected to the mounting base, and the mounting base being in floating connection with the first fixing plate;
   wherein the plug-in assembly comprises a connection pipe, an elastic connection pipe and a plug-in connector, the plug-in connector is connected to the mounting base, the connection pipe is connected to the first fixing plate, the elastic connection pipe is located between the mounting base and the first fixing plate, and two ends of the elastic connection pipe are in communication with the connection pipe and the plug-in connector, respectively, wherein the elastic connection pipe is a deformable tubular structure.

2. The electrical connection plug according to claim 1, wherein one side of the mounting base facing the first fixing plate is provided with a plurality of protruding portions, the plurality of protruding portions are in one-to-one correspondence with the plurality of plug-in assemblies, and the elastic connection pipe and the plug-in connector are connected to two ends of the protruding portion, respectively and are in communication with each other through the protruding portion.

3. The electrical connection plug according to claim 2, wherein the plug-in connector is sealingly connected to an inner wall surface of the protruding portion, and the elastic connection pipe is sealingly fitted over an outer circumferential surface of the protruding portion.

4. The electrical connection plug according to claim 1, wherein the connection pipe passes through the first fixing plate, an outer circumferential surface of the connection pipe is provided with a connection portion, the connection portion is connected to the first fixing plate, and the elastic connection pipe is sealingly connected to the connection pipe.

5. The electrical connection plug according to claim 1, wherein the elastic connection pipe is made of flexible material.

6. The electrical connection plug according to claim 5, wherein material of the elastic connection pipe is rubber.

7. The electrical connection plug according to claim 1, wherein the two ends of the elastic connection pipe are sealingly connected to the connection pipe and the mounting base, respectively, and are in communication with the connection pipe and the plug-in connector, and the connection pipe, the elastic connection pipe and the plug-in connector are configured to be passed by the cold source.

8. The electrical connection plug according to claim 1, wherein the electrical connection plug further comprises an annular sealing ring, the annular sealing ring is fitted over the mounting base and the first fixing plate, and two sides of an inner wall surface of the annular sealing ring are connected to the mounting base and the first fixing plate, respectively.

9. The electrical connection plug according to claim 8, wherein a plurality of separation portions are provided in the annular sealing ring, two ends of each of the plurality of separation portions are connected to the annular sealing ring, and separate a space in the annular sealing ring into a plurality of closed spaces, and the separation portions are configured for that the plurality of closed spaces are not in communication with each other.

10. The electrical connection plug according to claim 1, wherein the electrical connection assembly comprises a conductive pole, a flexible conductive member and a conductive plug, the conductive pole passes through the mounting base, the conductive plug passes through the first fixing plate, and two ends of the flexible conductive member are connected to the conductive pole and the conductive plug, respectively.

11. The electrical connection plug according to claim 10, wherein the flexible conductive member comprises an elastic conductive wire, and two ends of the elastic conductive wire are connected to the conductive pole and the conductive plug, respectively.

12. The electrical connection plug according to claim 10, wherein the flexible conductive member comprises a conductive spring, and two ends of the conductive spring are connected to the conductive pole and the conductive plug, respectively.

13. The electrical connection plug according to claim 10, wherein the flexible conductive member is defined with a cavity made of a flexible conductive material, and two ends of the cavity are connected to the conductive pole and the conductive plug, respectively.

14. An electrical connection device comprising an electrical connection plug, wherein the electrical connection plug comprises:

a first fixing plate, a mounting base, an electrical connection assembly and a plurality of plug-in assemblies, the plug-in assembly being configured to be passed by a cold source to cool the battery pack, the electrical connection assembly and the plurality of the plug-in assemblies being all connected to the mounting base, and the mounting base being in floating connection with the first fixing plate;

wherein the plug-in assembly comprises a connection pipe, an elastic connection pipe and a plug-in connector, the plug-in connector is connected to the mounting base, the connection pipe is connected to the first fixing plate, the elastic connection pipe is located between the mounting base and the first fixing plate, and two ends of the elastic connection pipe are in communication with the connection pipe and the plug-in connector, respectively, wherein the elastic connection pipe is a deformable tubular structure.

15. The electrical connection device according to claim 14, wherein the electrical connection device further comprises an electrical connection socket, and the electrical connection assembly and the plurality of plug-in assemblies are all connected to the electrical connection socket.

16. The electrical connection device according to claim 15, wherein the electrical connection socket comprises a second fixing plate, an electrical connector and a plurality of plug-in sockets, the electrical connector and the plurality of plug-in sockets are all connected to the second fixing plate, the electrical connector is detachably in electrical connection with the electrical connection assembly, the plurality of the plug-in sockets are in one-to-one correspondence with the plurality of the plug-in assemblies, and the plug-in socket is detachably connected to the plug-in assembly.

17. The electrical connection device according to claim 16, wherein one end of the plug-in assembly facing the plug-in socket is provided with a plug-in connector, the plug-in socket is fitted over the plug-in connector and is movable on the plug-in connector along a length direction of the plug-in connector, and the plug-in socket is in communication the plug-in connector.

18. The electrical connection device according to claim 17, wherein the plug-in connector and the electrical connection assembly are both exposed out of a side surface of the mounting base facing the second fixing plate, and a connection between the plug-in connector and the plug-in socket precedes a connection between the electrical connection assembly and the electrical connector.

19. An electric vehicle, comprising:
a battery pack,
a vehicle body, and
an electrical connection device, wherein the electrical connection device comprises an electrical connection plug, wherein the electrical connection plug comprises: a first fixing plate, a mounting base, an electrical connection assembly and a plurality of plug-in assemblies, the plug-in assembly being configured to be passed by a cold source to cool the battery pack, the electrical connection assembly and the plurality of the plug-in assemblies being all connected to the mounting base, and the mounting base being in floating connection with the first fixing plate;
wherein the plug-in assembly comprises a connection pipe, an elastic connection pipe and a plug-in connector, the plug-in connector is connected to the mounting base, the connection pipe is connected to the first fixing plate, the elastic connection pipe is located between the mounting base and the first fixing plate, and two ends of the elastic connection pipe are in communication with the connection pipe and the plug-in connector, respectively;
wherein the elastic connection pipe is a deformable tubular structure;
wherein the electrical connection plug is connected to the vehicle body, and the electrical connection socket is connected to the battery pack.

* * * * *